US007909493B2

(12) United States Patent
Nomura

(10) Patent No.: US 7,909,493 B2
(45) Date of Patent: Mar. 22, 2011

(54) VEHICLE HEADLAMP

(75) Inventor: Yukio Nomura, Shizuoka (JP)

(73) Assignee: Koito Manufacturing Co., Ltd., Toyko (JP)

( * ) Notice: Subject to any disclaimer, the term of this patent is extended or adjusted under 35 U.S.C. 154(b) by 0 days.

(21) Appl. No.: 12/614,477

(22) Filed: Nov. 9, 2009

(65) Prior Publication Data

US 2010/0124069 A1 May 20, 2010

(30) Foreign Application Priority Data

Nov. 19, 2008 (JP) ................................ 2008-296182

(51) Int. Cl.
*B60Q 1/26* (2006.01)

(52) U.S. Cl. ........................................ 362/539; 362/538

(58) Field of Classification Search .................. 362/465, 362/507, 509, 512, 538, 539
See application file for complete search history.

(56) References Cited

U.S. PATENT DOCUMENTS

| | | | | |
|---|---|---|---|---|
| 7,350,946 | B2 * | 4/2008 | Yagi et al. | 362/517 |
| 7,478,933 | B2 * | 1/2009 | Tajima et al. | 362/512 |
| 7,736,038 | B2 * | 6/2010 | Suzuki | 362/539 |
| 2006/0291230 | A1 | 12/2006 | Tajima et al. | |

FOREIGN PATENT DOCUMENTS

JP 2006-341696 A 12/2006

* cited by examiner

*Primary Examiner* — Hargobind S Sawhney
(74) *Attorney, Agent, or Firm* — Sughrue Mion, PLLC

(57) ABSTRACT

A vehicle headlamp is provided with: a projection lens disposed on an optical axis extending in a front and rear direction of a vehicle; a light source disposed rearwardly of a rear-side focal point of the projection lens; a reflector configured to reflect direct light from the light source forward to converge reflected light toward the optical axis; a movable shade disposed between the projection lens and the light source and configured to blocking a part of the reflected light from the reflector and a part of the direct light from the light source to form a cutoff line in a light distribution pattern; and a bracket formed from a metal plate member and disposed between the projection lens and the light source, wherein the movable shade is rotatably supported on the bracket. An opening portion is formed in the bracket and configured to pass a part of the reflected light from the reflector along the optical axis. A shade portion is provided on the opening portion and configured to cover a gap between the movable shade and an opening edge of the opening portion.

4 Claims, 10 Drawing Sheets

VEHICLE HEADLAMP

BACKGROUND OF THE INVENTION

1. Field of the Invention

The present invention relates to a vehicle headlamp, and particularly to a projector-type vehicle headlamp having a variable light distribution function which is capable of changing a light distribution of the headlamp in accordance with a driving condition of a vehicle or the like.

2. Background Art

In general, a vehicle headlamp having a projector-type lighting unit is structured to reflect light from a light source disposed on an optical axis extending in a front and rear direction of a vehicle forward so as to be close to the optical axis using a reflector, and direct the reflected light toward the front of a lamp via a projection lens provided forwardly of the reflector.

When the projector-type vehicle lighting unit is structured as a vehicle headlamp for passing beam (low beam) irradiation, a shade for removing upward irradiation light by blocking a part of the reflected light from the reflector is provided between the projection lens and the reflector, whereby forward beam irradiation is performed in a passing beam light distribution pattern having a predetermined cutoff line.

In general, since the shade of the vehicle headlamp is stationary, when the shade is set for, e.g., the passing beam light distribution pattern, the lighting unit can be used only for the passing beam and, therefore, it is impossible to switch the lighting unit to the use for a running beam (high beam).

Accordingly, there is proposed a vehicle lighting fixture (vehicle headlamp) in which a shade is adapted to be a movable shade movable to a passing beam position and a running beam position, an upper end edge of the shade is positioned at a focal point of a projection lens when the shade is positioned at the passing beam position, and the upper end edge is appropriately moved out of the focal point of the projection lens when the shade is positioned at the running beam position, whereby optimum light distribution characteristics as the vehicle light fixture for the passing beam and for the running beam are obtainable (see, e.g., JP-A-2006-341696).

The above-described shade (movable shade) of the vehicle lighting fixture described in JP-A-2006-341696 is rotatably supported inside an attachment frame, the attachment frame has a generally tubular shape and is attached to the front end part of a reflector, and a light projection lens (projection lens) is attached to an opening on the front surface.

In general, the attachment frame having the substantially tubular shape is formed by aluminum die casting or the like in which a melted aluminum alloy is injected into a molding die and integrally molded. In recent years, further weight reduction is required in order to improve fuel efficiency, but the weight reduction by the aluminum die casting has its limits.

SUMMARY OF THE INVENTION

One or more embodiments of the invention provide a vehicle headlamp in which a weight of a bracket for rotatably supporting a movable shade is reduced to achieve a light-weight inexpensive projector-type vehicle headlamp.

In accordance with one or more embodiments of the invention, a vehicle headlamp is provided with: a projection lens (11, 111) disposed on an optical axis (Ax) extending in a front and rear direction of a vehicle; a light source (23*a*, 123*a*) disposed rearwardly of a rear-side focal point (F) of the projection lens (11, 111); a reflector (25, 125) configured to reflect direct light from the light source (23*a*, 123*a*) forward to converge reflected light toward the optical axis (Ax); a movable shade (30, 130) disposed between the projection lens (11, 111) and the light source (23*a*, 123*a*) and configured to blocking a part of the reflected light from the reflector (25, 125) and a part of the direct light from the light source (23*a*, 123*a*) to form a cutoff line in a light distribution pattern; a bracket (32, 122) formed from a metal plate member and disposed between the projection lens (11, 111) and the light source (23*a*, 123*a*), wherein the movable shade (30, 130) is rotatably supported on the bracket (32, 122); an opening portion (32*a*, 122*a*) formed in the bracket (32, 122) and configured to pass a part of the reflected light from the reflector (25, 125) along the optical axis (Ax); and a shade portion (33, 133) provided on the opening portion (32*a*, 122*a*) and configured to cover a gap between the movable shade (30, 130) and an opening edge of the opening portion (32*a*, 122*a*).

According to the vehicle headlamp having the above-described structure, since the shade portion for covering the gap formed between the movable shade and the opening edge is provided at the opening portion of the bracket for rotatably supporting the movable shade, it is possible to prevent the leakage of the reflected light of the reflector from the gap formed between the opening portion of the bracket and the movable shade which are formed from the plate members.

Accordingly, since the bracket may be formed from the metal plate member, it is possible to achieve lighter weight than in the case of the formation by aluminum die casting. In addition, since the bracket may be manufactured from the metal plate member by press working or the like, it is possible to achieve lower manufacturing cost than in the case of the manufacturing by aluminum die casting.

In the vehicle headlamp having the above-described structure, the shade portion (33, 133) may be formed from a metal plate member separately from the bracket (32, 122), and may be fixed at an offset position which does not interfere with a movement of the movable shade (30, 130).

By the above configuration that the shade portion formed from the metal plate member separately from the bracket is fixed at the offset position which does not interfere with the movement of the movable shade, it becomes easy to form the shade portion which does not interfere with the movable shade, and it becomes possible to further reduce the manufacturing cost.

In addition, in the vehicle headlamp having the above-described structure, the movable shade (30, 130) may be supported by the bracket (32, 122) through a rotation shaft (42, 142), and the rotation shaft (42, 142) is fixed on the bracket by swaging.

According to the vehicle headlamp having such a structure, it is possible to improve attachment accuracy of the movable shade to the bracket and easily fix the movable shade to the bracket without increasing the number of parts.

Further, in the vehicle headlamp having the above-described structure, the movable shade (30, 130) may be formed from a metal plate member, a surface contact portion (30*c*, 130*c*) for abutting on a rear surface of the opening edge of the bracket (32, 122) may be formed at an each end part of the movable shade (30, 130) in a horizontal direction, and a reinforcement rib (32*e*, 132*e*) may be provided at the opening edge of the bracket (32, 122) on which the surface contact portion (30*c*, 130*c*) abuts.

According to the vehicle headlamp having such a structure, the stiffness and durability of the movable shade formed from the metal plate member are enhanced by the formation of the surface contact portion. In addition, since the reinforcement rib is provided at the opening edge of the bracket on which the surface contact portion of the movable shade abuts, the stiffness and durability thereof are enhanced.

Other aspects and advantages of the invention will be apparent from the following description, the drawings and the claims.

DETAILED DESCRIPTION OF THE EXEMPLARY EMBODIMENTS

A detailed description will be given hereinbelow to exemplary embodiments of a vehicle headlamp according to the present invention, on the basis of the accompanying drawings.

Figure 1:
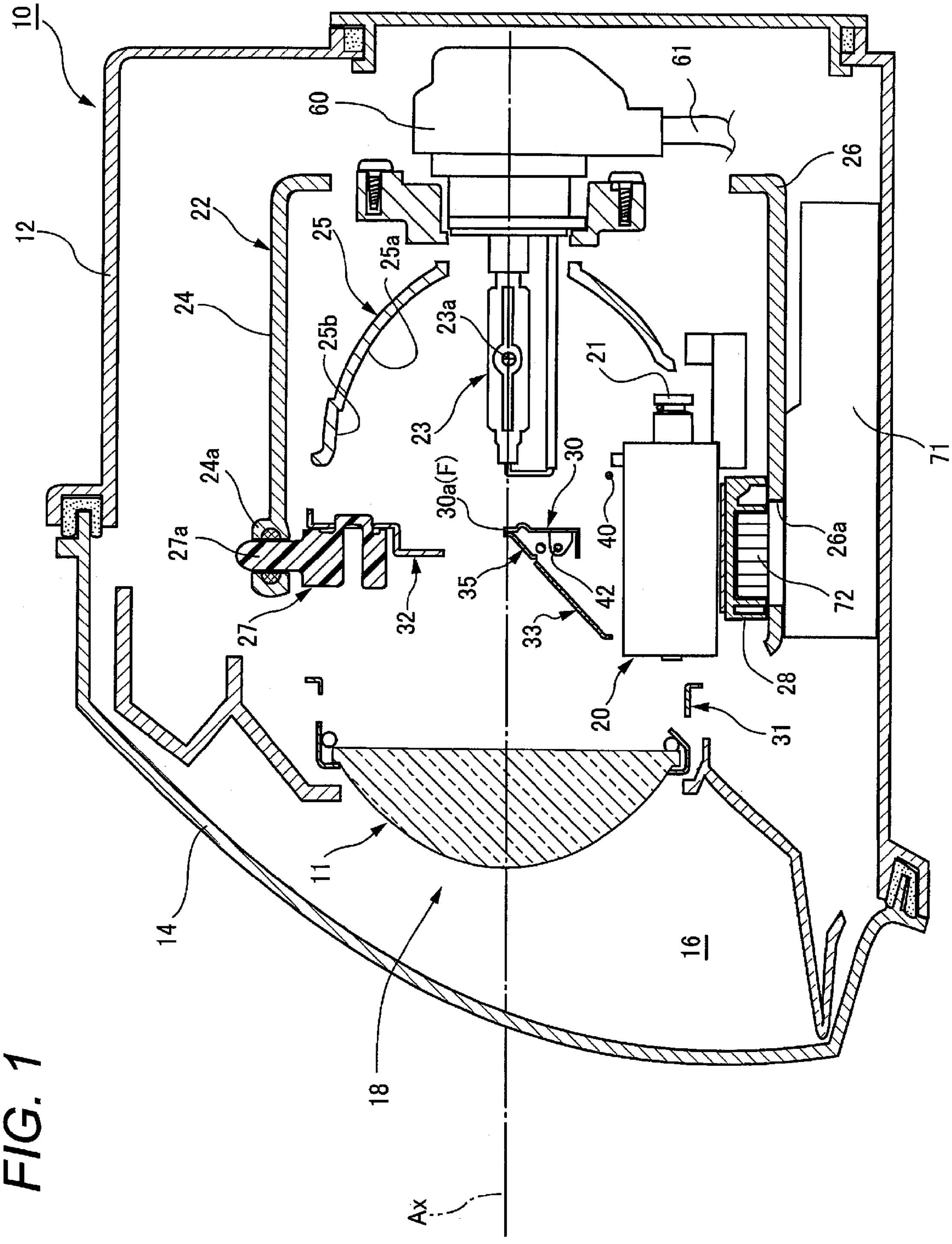
FIG. 1 is a longitudinal sectional view of a vehicle headlamp according to a first embodiment of the present invention.
Figure 2:
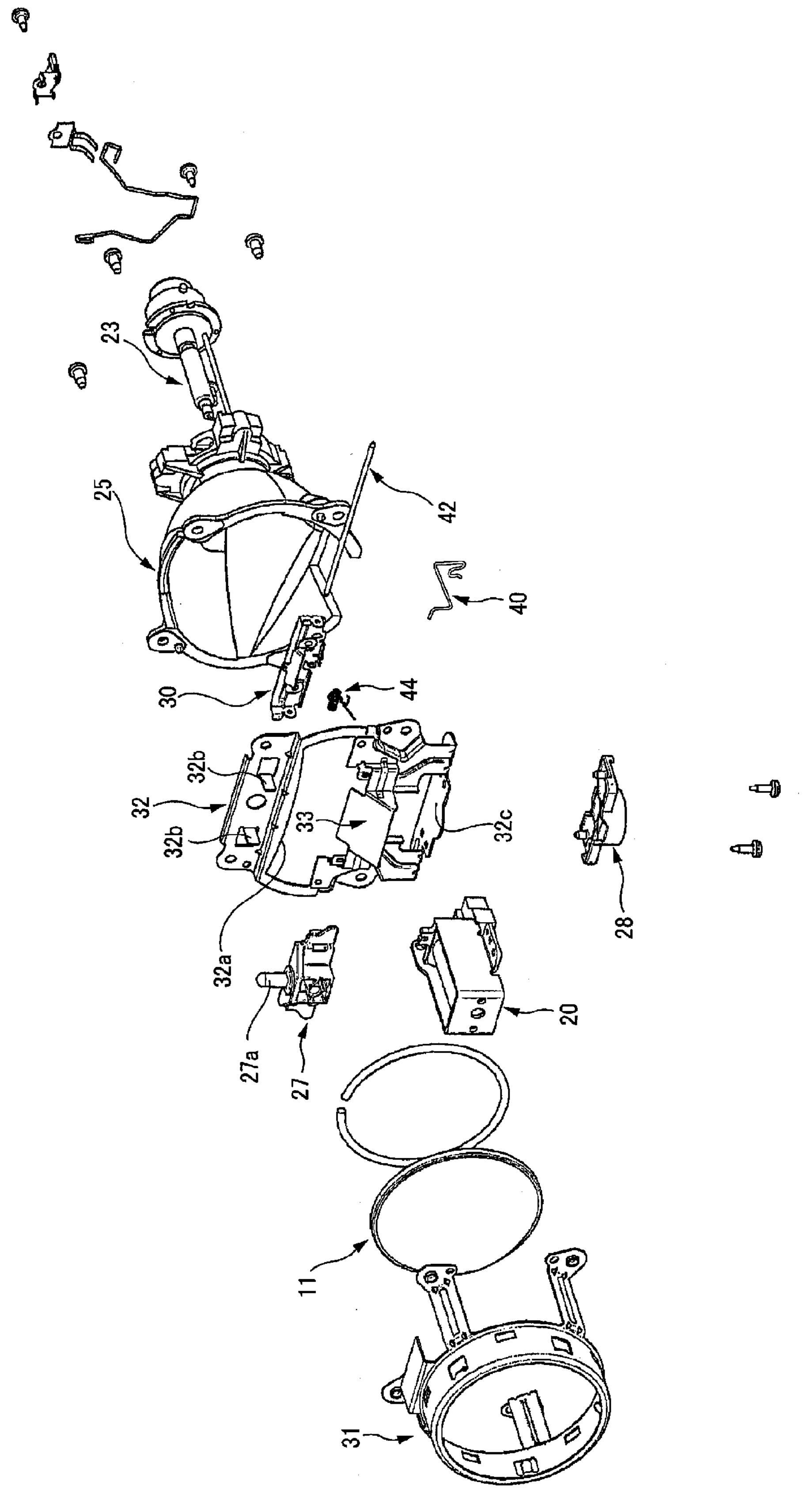
FIG. 2 is an exploded perspective view of a lighting unit shown in FIG. 1.
Figure 3:
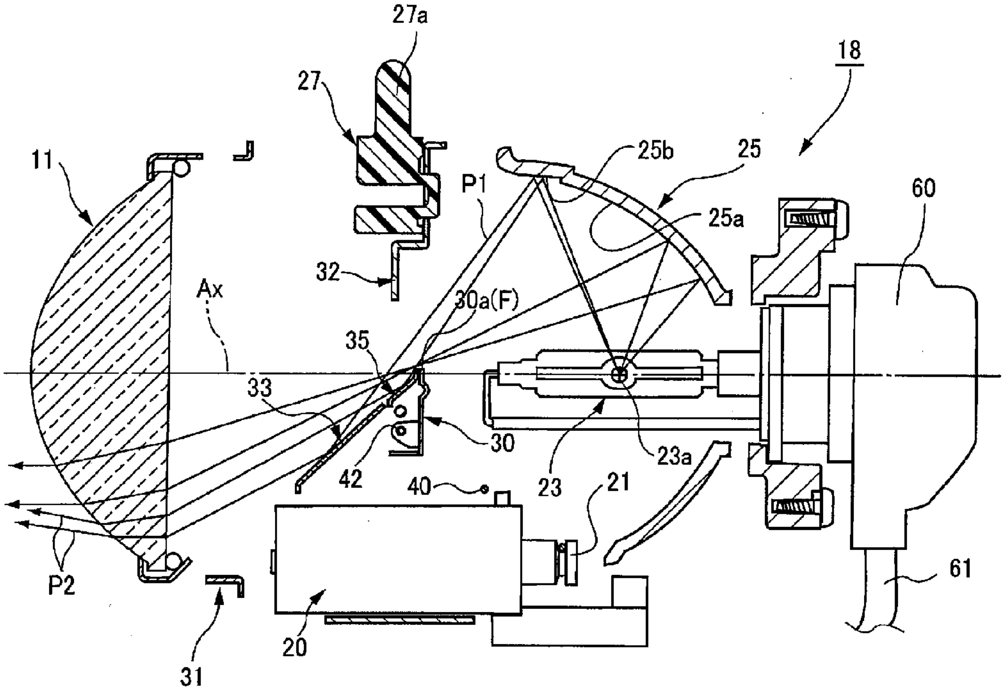
FIG. 3 is a longitudinal sectional view of the lighting unit shown in FIG. 1.
Figure 4:
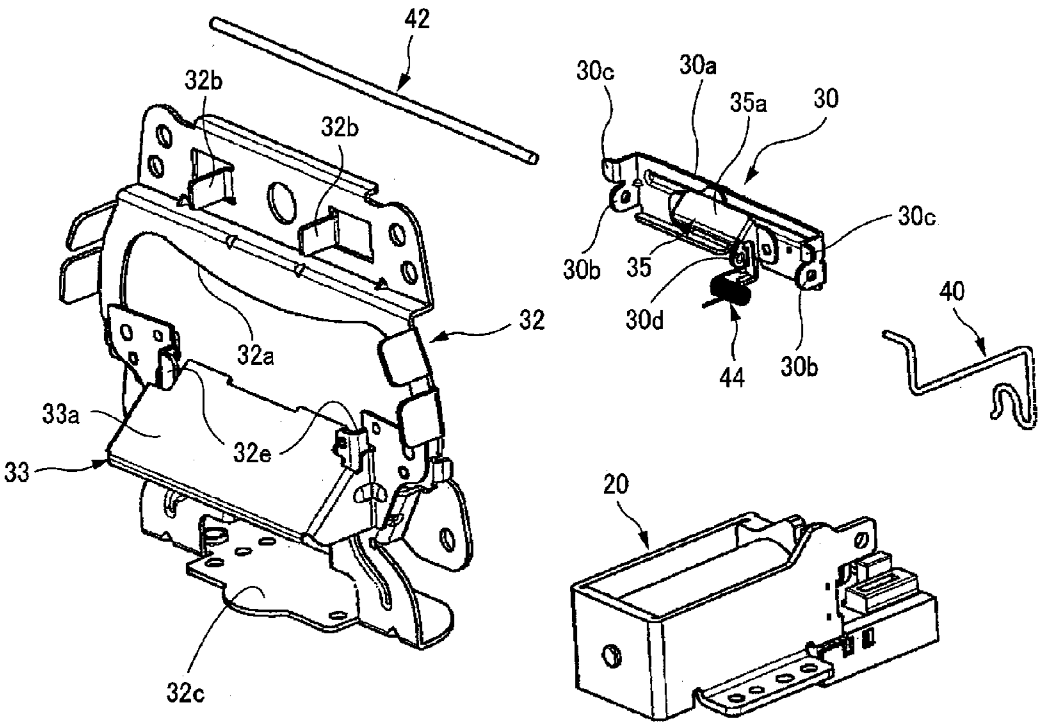
FIG. 4 is an exploded rear view of a movable shade shown in FIG. 1.
Figure 5:
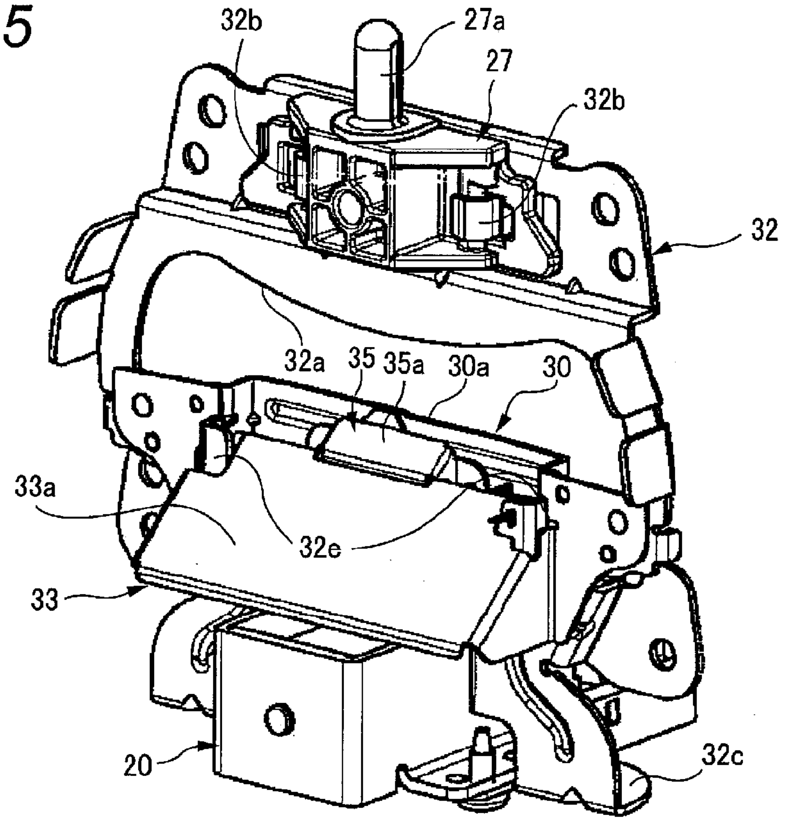
FIG. 5 is a front side perspective view of an assembly obtained by attaching the movable shade and an actuator to a bracket shown in FIG. 1.
Figure 6:
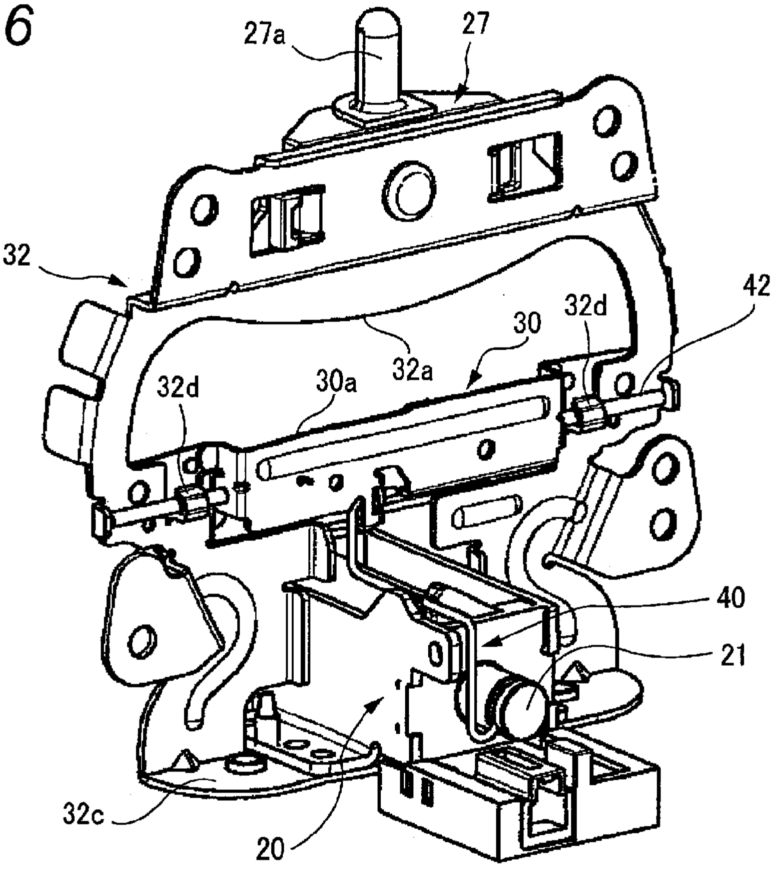
FIG. 6 is a rear side perspective view of the assembly obtained by attaching the movable shade and the actuator to the bracket shown in FIG. 1.

FIG. 1 is a longitudinal sectional view of a vehicle headlamp according to a first embodiment of the present invention, FIG. 2 is an exploded perspective view of a lighting unit shown in FIG. 1, FIG. 3 is a longitudinal sectional view of the lighting unit shown in FIG. 1, FIG. 4 is an exploded perspective view of a movable shade shown in FIG. 2, and FIGS. 5 and 6 are a front side perspective view and a rear side perspective view of an assembly obtained by attaching the movable shade and an actuator to a bracket shown in FIG. 1.

As shown in FIGS. 1 and 2, a vehicle lighting fixture 10 according to the present embodiment has a structure in which a lighting unit 18 is housed in a lamp room 16 formed by a transparent cover 14 and a lamp body 12.

As shown in FIGS. 1 and 2, the lighting unit 18 of the present embodiment is a projector-type lighting unit, and has a projection lens 11 which is disposed on an optical axis (lens center axis) Ax extending in a front and rear direction of a vehicle, a light source bulb (discharge bulb) 23 which is disposed rearwardly of a rear-side focal point F of the projection lens 11, a reflector 25 which reflects light (direct light) emitted from the light source bulb 23 forward so as to be close to the optical axis Ax using a light source 23*a* of the light source bulb 23 as the first focal point, a movable shade 30 which is disposed between the projection lens 11 and the light source 23*a* and blocks a part of reflected light from the reflector 25 and a part of the direct light from the light source 23*a* to form a cutoff line of a light distribution pattern, and a bracket 32 which is disposed between the projection lens 11 and the light source 23*a* and rotatably supports the movable shade 30.

In addition, as shown in FIG. 1, the lighting unit 18 is supported by a frame 22 via the bracket 32, and the frame 22 is supported by the lamp body 12 via an aiming mechanism which is not shown. The aiming mechanism is a mechanism for finely adjusting an attachment position and an attachment angle of the lighting unit 18, and the optical axis Ax of the lighting unit 18 is adjusted to extend in a direction downward by about 0.5 through 0.6 degree relative to the front and rear direction of the vehicle at the point when the aiming adjustment is completed.

The frame 22 has a substantially rectangular shape when viewed from the front, and support plates 24 and 26 are provided to protrude forward from upper and lower sides of the frame 22. The front end part of the support plate 24 on the upper side is provided with a bearing portion 24*a*, and a supported shaft 27*a* of a coupling member 27 provided on the upper part of the lighting unit 18 is rotatably supported by the bearing portion 24*a*. The support plate 26 on the lower side is formed with a circular shaft insertion hole 26*a* at a part of the front end part of the support plate 26 positioned immediately below the bearing portion 24*a*. Further, a swivel actuator 71 for rotating the lighting unit 18 in a horizontal direction is fixed on the lower surface of the support plate 26 on the lower side of the frame 22.

The swivel actuator 71 is driven by, e.g., reacting to a steering operation to cause an output shaft 72 to rotate. The output shaft 72 is inserted through the shaft insertion hole 26*a* of the support plate 26 and fitted into a joint portion 28 provided on the lower part of the lighting unit 18, and the joint portion 28 is coupled to the output shaft 72.

Consequently, when the swivel actuator 71 is driven, the output shaft 72 is caused to rotate and the lighting unit 18 is caused to rotate in the horizontal direction with the rotation of the output shaft 72.

Because the joint portion 28 is attached to an attachment portion 32*c* after the joint portion 28 is formed separately from the bracket 32, it is possible to appropriately replace the joint portion 28 according to specifications of the lighting unit so that flexibility of the bracket 32 is enhanced.

The bracket 32 press-molded from a metal plate has a substantially rectangular plate shape when viewed from the front as shown in FIG. 4, and is formed with an opening portion 32*a* through which the optical axis Ax passes at its central part. Swaging pieces 32*b* for fixing the coupling member 27 are provided at the upper part of the bracket 32, and the attachment portion 32*c* for fixing the actuator 20 is provided at the lower part thereof.

The bracket 32 is a shade for preventing the incidence of stray light reflected by a reflecting surface 25*a* of the reflector 25 on the projection lens 11, and the projection lens 11 is fixed on the front surface side of the bracket 32 via a lens holder 31 and the reflector 25 is fixed on the rear surface side thereof.

As shown in FIGS. 3 and 4, the movable shade 30 is press-molded from the metal plate and has a substantially rectangular plate shape, and is provided so as to be positioned in the vicinity below the optical axis Ax. At both end parts of the movable shade 30, shaft support portions 30*b* through which a shaft 42 is rotatably inserted and abutment portions (surface contact portion) 30*c* for abutting on an opening edge of the bracket 32 at a blocking position to control the rotation are formed by bending.

It is to be noted that, on the opening edge of the bracket 32 on which the abutment portions 30*c* of the movable shade 30 abut, reinforcement ribs 32*e* formed by forward bending are provided. Accordingly, the stiffness and durability of the movable shade 30 formed from the metal plate member are enhanced by the formation of the abutment portions 30*c* by bending. Further, since the reinforcement ribs 32*e* formed by bending are also provided on the opening edge of the bracket 32 on which the abutment portions 30*c* of the movable shade 30 abut, the stiffness and durability thereof are enhanced.

The movable shade 30 is structured to be capable of taking the blocking position at which an upper end edge 30*a* is disposed so as to be positioned in the vicinity of the rear-side focal point F, and a blocking lessening position at which the blocked amount of reflected light from the reflector 25 becomes smaller than the blocked amount at the blocking position. The upper end edge 30*a* of the movable shade 30 is formed to have a lateral level difference between left and right sides thereof and, when the movable shade 30 is at the blocking position, the upper end edge 30 forms the cutoff line of a passing beam light distribution pattern.

Figure 7:
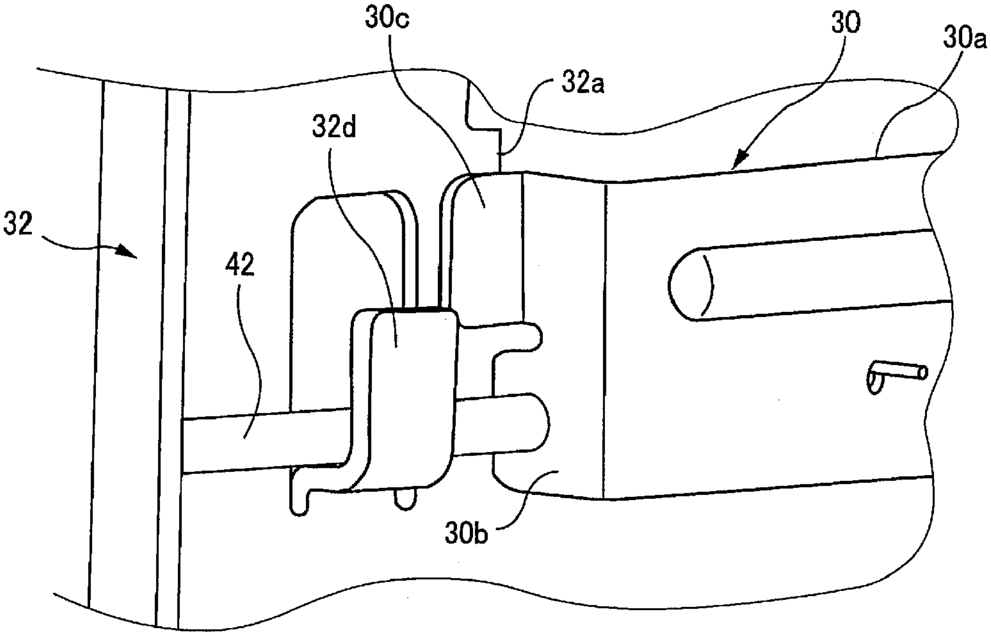
FIG. 7 is an enlarged perspective view of a principal portion for illustrating a method for attaching the movable shade.
Figure 8:
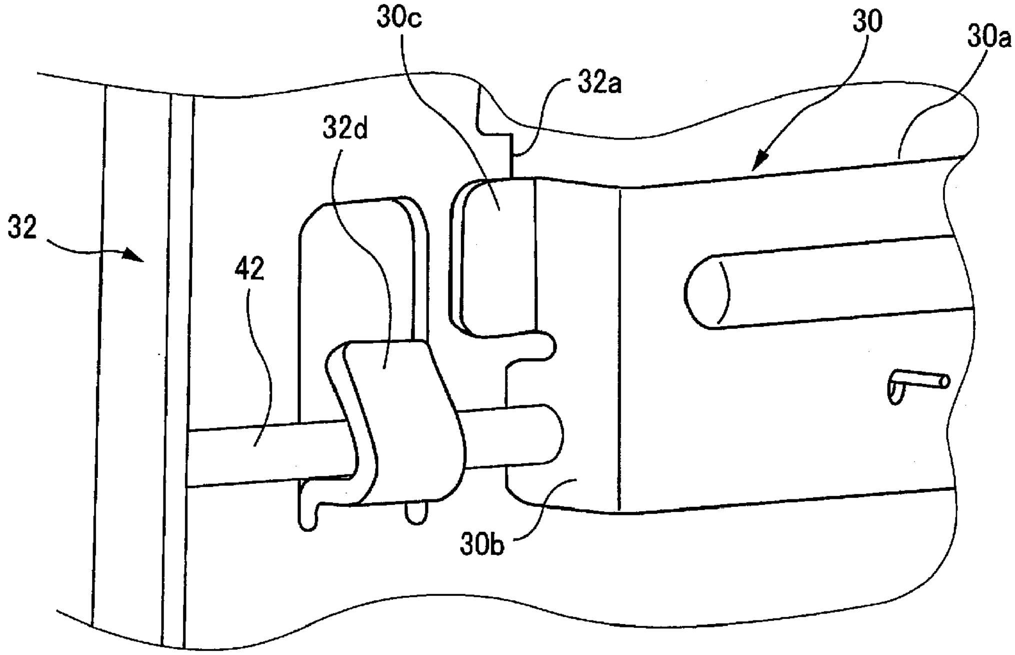
FIG. 8 is an enlarged perspective view of the principal portion for illustrating the method for attaching the movable shade.

In addition, as shown in FIG. 7, in the movable shade 30, both end parts of the shaft 42 are set on the swaging pieces 32*d* of the bracket 32 in a state where the shaft 42 with a predetermined length is inserted through the shaft support portions 30*b* and 30*b* formed on the left and right end parts. Then, as shown in FIG. 7, by swaging the swaging pieces 32*d*, the both end parts of the shaft 42 are fixed by the swaging on the rear surface side of the bracket 32 and the movable shade 30 is rotatably supported by the bracket 32.

Accordingly, the attachment accuracy of the movable shade 30 to the bracket 32 is improved and it is possible to easily fix the movable shade 30 to the bracket 32 without increasing the number of parts.

To a rod engagement portion 30*d* formed by cutting and raising on the movable shade 30, a shade-side engagement portion of a rod member 40 is coupled. A return spring 44 is wound around the shaft 42. The return spring 44 is a metal helical torsion coil spring, and one end part thereof is engaged with the movable shade 30 and the other end part thereof is engaged with the bracket 32. The return spring 44 is adapted to elastically bias the movable shade 30 toward the blocking position constantly. When the movable shade 30 moves to the blocking position, the abutment portions 30*c* and 30*c* formed on the both end parts abut on the rear surface of the bracket 32 to position the movable shade 30 at the blocking position.

By the drive of the actuator 20 coupled to an actuator-side engagement portion of the rod member 40, the movement of the movable shade 30 between the blocking position and the blocking lessening position is performed.

On the front side of the movable shade 30, an overhead sign member 35 is attached. The overhead sign member 35 is a metal plate member formed by bending so as to have a forwardly downwardly inclined surface, and the inclined surface is used as a light receiving surface for overhead sign 35*a* for reflecting reflected light P1 from a reflecting surface for overhead sign 25*b* which will be described later toward the projection lens 11 and causing overhead sign irradiation light P2 as upward irradiation light to be projected from the projection lens 11.

As shown in FIG. 6, the actuator 20 is attached to the attachment portion 32*c* of the bracket 32, and is a solenoid disposed such that the output axis 21 thereof is protruded in the rear direction of the vehicle.

When the operation of a beam selector switch which is not shown is performed, the actuator 20 is driven, and transmits the linear reciprocating motion of the output axis 21 thereof to the rod member 40 to cause the movable shade 30 coupled to the shade-side engagement portion of the rod member 40 to rotate.

The rod member 40 is formed of a wire-like member formed by bending. When the rod member 40 reciprocates along a substantially front and rear direction, the movable shade 30 having the rod engagement portion 30*d* coupled to the shade-side engagement portion performs rotation about the shaft 42 extending in a width direction of a vehicle between the blocking position and the blocking lessening position.

Further, as shown in FIGS. 1 to 5, there is provided, on the front surface of the bracket 32, a stationary shade (shade portion) 33 which is fixed at an offset position which does not interfere with the rotation of the movable shade 30 and prevents the incidence of the stray light on the projection lens 11. That is, although a gap for allowing the rotation of the movable shade 30 is formed between the opening portion 32*a* of the bracket 32 and the movable shade 30 which are formed from the plate members, since the stationary shade 33 is provided, it is possible to prevent the leakage of the reflected light of the reflector 25 from the gap.

The stationary shade 33 is formed of the metal plate member formed by bending so as to have the forwardly downwardly inclined surface, and the inclined surface is used as a light receiving surface for overhead sign 33*a* for reflecting the reflected light P1 from the reflecting surface for overhead sign 25*b* which will be described later toward the projection lens 11 and causing the overhead sign irradiation light P2 as the upward irradiation light to be projected from the projection lens 11. In addition, by forming the plate metal member so as to have the forwardly downwardly inclined surface by bending, the stationary shade 33 can secure the stiffness. Further, the light receiving surface for overhead sign 35*a* is also used.

The projection lens 11 is constituted of a flat convex lens that has a convex surface on the front side thereof and a flat surface on the rear side thereof. As shown in FIG. 1, the projection lens 11 is disposed on the optical axis Ax such that the rear-side focal point F thereof is positioned at the second focal point of the reflecting surface 25*a* of the reflector 25. With this structure, an image on the focal point surface including the rear-side focal point F is projected forward as a reverse image.

The light source bulb 23 is a discharge bulb having a discharge light-emitting portion as the light source 23*a* such as a metal halide bulb or the like, and the light source bulb 23 is inserted into and fixed to the rear end part of the reflector 25 in a direction in which a bulb axis is aligned with the lens center axis Ax in the case of the present embodiment.

A bulb socket 60 is attached to the light source bulb 23. A power feeding cord 61 extending from the bulb socket 60 passes behind the lighting unit 18, extends downwardly, and is connected to a lighting circuit unit (not shown) disposed at the lower part of the lamp body 12. With this structure, a lighting voltage and a starting voltage are supplied to the light source bulb 23 from a discharge lighting circuit provided in the lighting circuit unit.

It is to be noted that a halogen bulb or the like may also be used instead of the discharge bulb, and the light source bulb 23 may also be inserted from the side of the reflector 25 and fixed with the bulb axis positioned in a direction substantially intersecting the lens center axis Ax.

It goes without saying that the concept of "a direction substantially intersecting" includes the case where the light source bulb 23 is disposed such that the optical axis thereof is orthogonal to the optical axis Ax extending in the front and rear direction of the vehicle. The concept also includes the case where the light source bulb 23 is disposed such that the optical axis thereof three-dimensionally intersects the optical axis Ar and the case where the light source bulb 23 is disposed in a state where the optical axis thereof is inclined by about ±15° relative to the horizontal line in the width direction of the vehicle.

The reflector 25 has the reflecting surface 25*a* of a substantially elliptical spherical shape having the optical axis As passing through the light source 23*a* as the center axis.

The reflecting surface 25 is set as a substantially oval-shaped elliptical reflecting surface with a cross-sectional configuration including the lens center axis Ax having the central position of the light source 23*a* as the first focal point and the vicinity of the rear-side focal point F of the projection lens 11 as the second focal point, and the reflecting surface 25*a* is adapted to reflect light from the light source 23*a* forward to converge the reflected light toward the optical axis Ax. The eccentricity of the reflecting surface 25*a* is set to be gradually increased from the vertical cross section toward the horizontal cross section.

As a reflecting surface continuously provided at the end part of the reflecting surface 25*a* of the reflector 25, the reflecting surface for overhead sign 25*b* is formed integrally with the reflecting surface 25*a*.

The reflecting surface for overhead sign 25*b* is set as a substantially oval-shaped curved surface with a cross-sectional configuration including the optical axis Ax having the central position of the light source 23*a* as the first focal point and the vicinity of the center of the light receiving surfaces for overhead sign 33*a* and 35*a* positioned slightly forwardly of the rear-side focal point F of the projection lens 11 as the second focal point, and the reflecting surface for overhead sing 25*b* is adapted to reflect and converge the light from the light source 23*a* to the light receiving surfaces for overhead sign 33*a* and 35*a*. The eccentricity of the reflecting surface for overhead sign 25*b* is set to be gradually increased from the vertical cross section toward the horizontal cross section. Subsequently, the light incident on the light receiving surfaces for overhead sign 33*a* and 35*a* from the reflecting surface for overhead sign 25*b* is caused to impinge on the projection lens 11 as the upward irradiation light P1.

Next, a description will be given to the light distribution by the vehicle headlamp 10 described above.

As shown in FIG. 3, when the movable shade 30 is at the blocking position, the movable shade 30 forms the passing beam light distribution pattern having what is called a Z-shaped cutoff line with a lateral level difference between left and right sides thereof.

The reflected light P1 from the reflecting surface for overhead sign 25*b* is caused to impinge on the projection lens 11 as the upward light by the light receiving surfaces for overhead sign 33*a* and 35*a*, and is caused to be projected from the projection lens 11 as the overhead sign irradiation light P2, whereby an OHS light distribution pattern in which the overhead sign is directed above the passing beam light distribution pattern is formed.

According to the vehicle headlamp 10 of the present first embodiment thus described, since the stationary shade 33 for blocking the gap formed between the movable shade 30 and the opening edge is provided at the opening portion 32*a* of the bracket 32 for rotatably supporting the movable shade 30, it is possible to prevent the leakage of the reflected light of the reflector 25 from the gap formed between the opening portion 32*a* of the bracket 32 and the movable shade 32*a* which are formed from the plate members.

Accordingly, since the bracket 32 may be formed from the metal plate member, it is possible to achieve lighter weight than in the case of the formation by aluminum die casting. Further, since it is possible to manufacture the bracket 32 from the metal plate member by press working or the like, it is possible to achieve lower manufacturing cost than in the case of the manufacturing by the aluminum die casting.

Consequently, it is possible to achieve the weight reduction of the bracket 32 for rotatably supporting the movable shade 30 and thereby provide a lightweight inexpensive projector-type vehicle headlamp 10.

Figure 9:
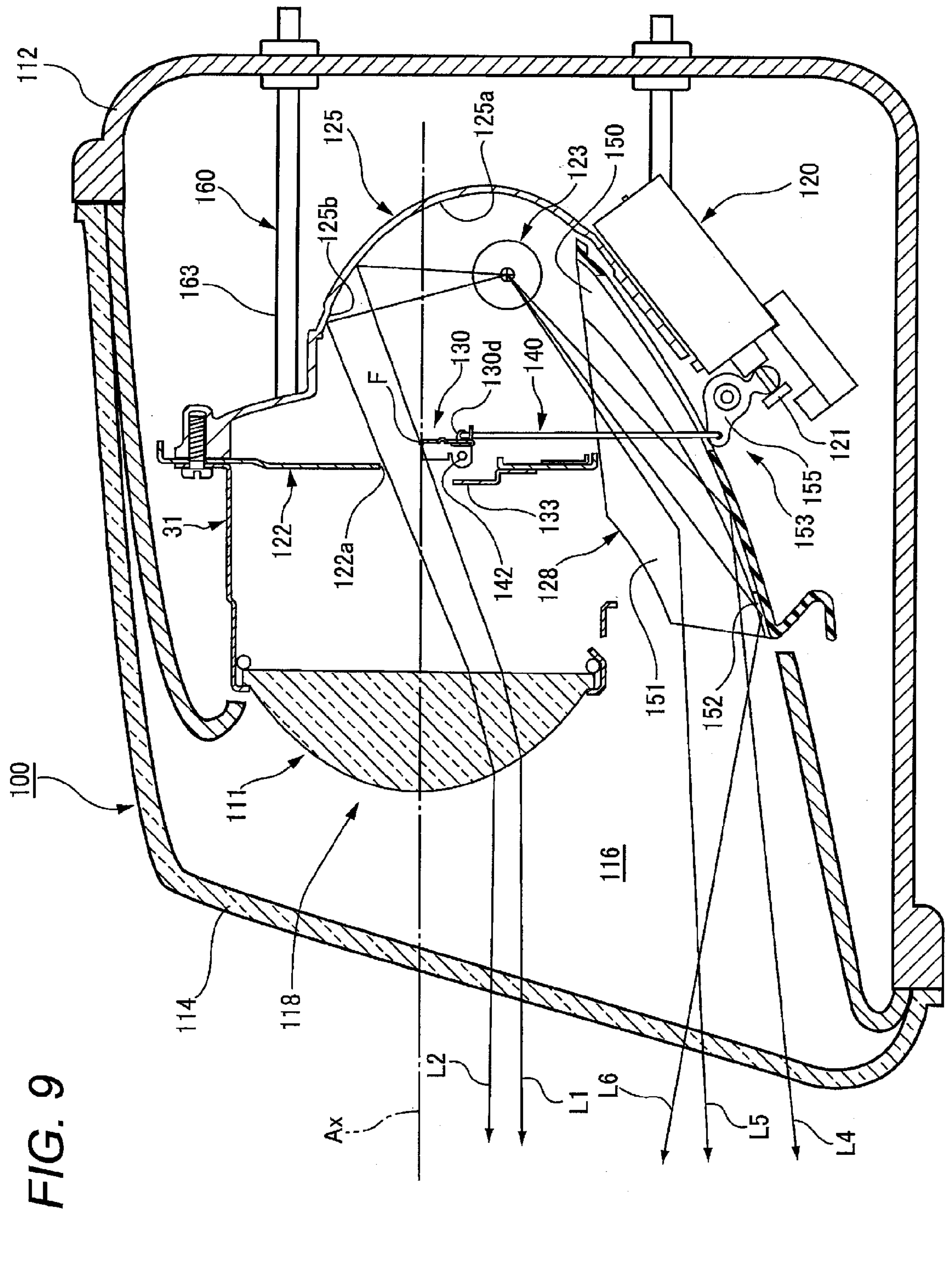
FIG. 9 is a longitudinal sectional view of a vehicle headlamp according to a second embodiment of the present invention.
Figure 10:
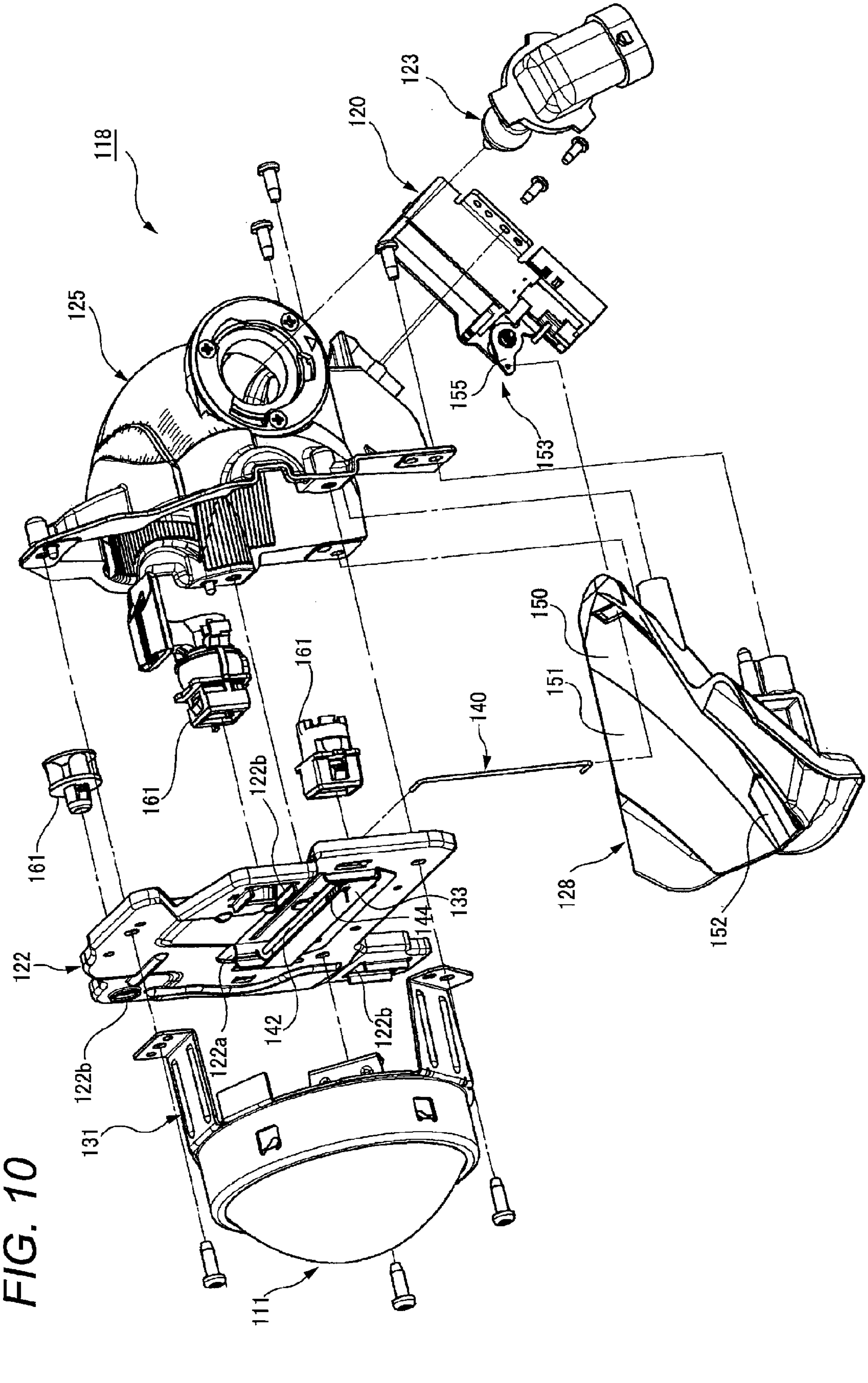
FIG. 10 is an exploded perspective view of a lighting unit shown in FIG. 9.
Figure 11:
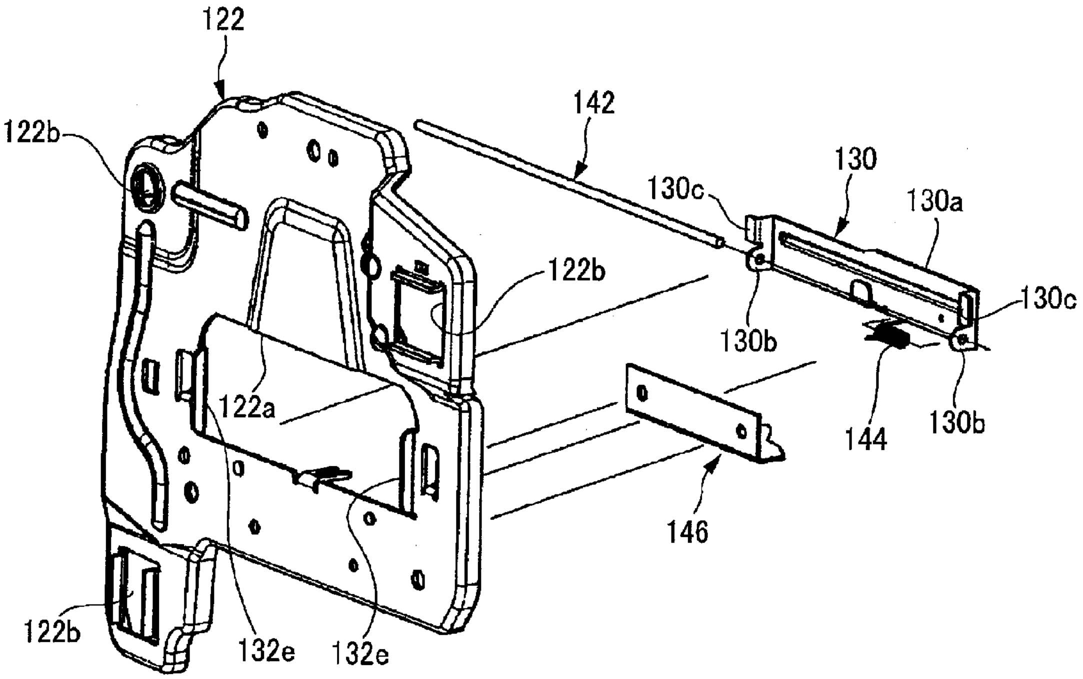
FIG. 11 is an exploded perspective view of a movable shade shown in FIG. 10.
Figure 12:
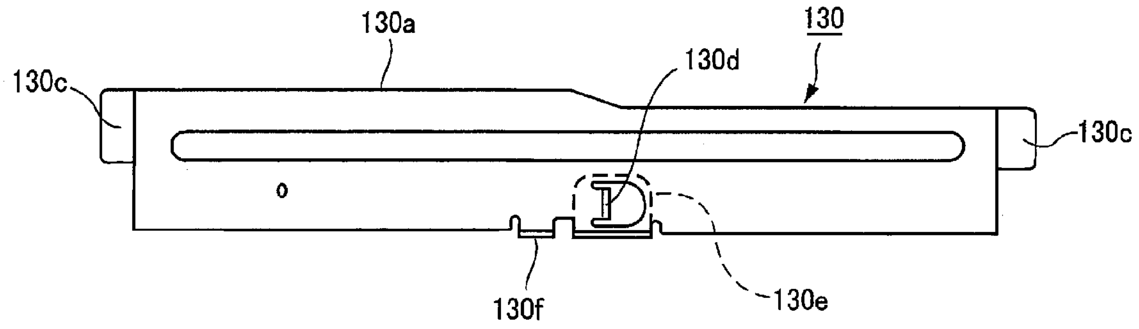
FIG. 12 is a rear view of the movable shade shown in FIG. 9.
Figure 13:
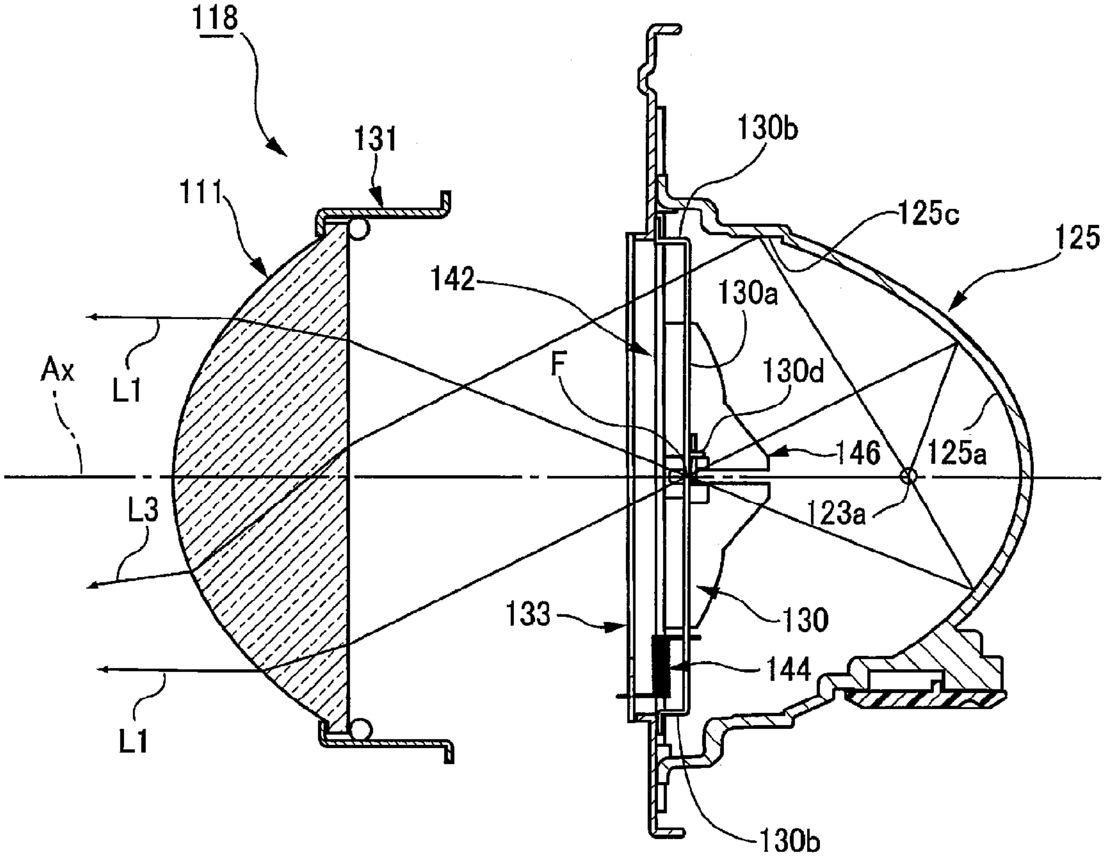
FIG. 13 is a horizontal sectional view of the lighting unit shown in FIG. 9.

FIG. 9 is a longitudinal sectional view of a vehicle headlamp according to a second embodiment of the present invention, FIG. 10 is an exploded perspective view of a lighting unit shown in FIG. 9, FIG. 11 is an exploded perspective view of a movable shade shown in FIG. 10, FIG. 12 is a rear view of the movable shade shown in FIG. 9, and FIG. 13 is a horizontal sectional view of the lighting unit shown in FIG. 9.

As shown in FIGS. 9 and 10, a vehicle lighting fixture 100 according to the present embodiment has a structure in which a lighting unit 118 is housed in a lamp room 116 formed by a transparent cover 114 and a lamp body 112.

The lighting unit 118 is supported by the lamp body 112 via a bracket 122, and the bracket 122 is supported by the lamp body 112 via an aiming mechanism 160.

The aiming mechanism 160 is a mechanism for finely adjusting the attachment position and angle of the lighting unit 118, and the optical axis (lens center axis) Ax of the lighting unit 118 is adjusted to extend in a direction downward by about 0.5 through 0.6 degree relative to the front and rear direction of the vehicle at the point when the aiming adjustment is completed.

The bracket 122 press-molded from a metal plate has a substantially rectangular plate shape when viewed from the front as shown in FIG. 3, and is provided with a central opening portion 122*a* through which the optical axis Ax passes and three attachment holes 122*b* to which bearing members 161 to be engaged with one end of an aiming screw 163 in the aiming mechanism 160 are attached.

The bracket 122 is a shade for preventing the incidence of stray light reflected by a reflecting surface 125*a* of a reflector 125 on a projection lens 111, and the projection lens 111 is fixed on the front surface side of the bracket 122 via a lens holder 131 and the reflector 125 is fixed on the rear surface side thereof.

As shown in FIGS. 11 and 13, a control member 146 for controlling reflected light by blocking a part of direct light traveling from a halogen bulb 123 toward an additional reflector 128 is provided on the rear surface side at the lower part of the bracket 122.

As shown in FIGS. 9 and 10, the lighting unit 118 of the present embodiment is a projector-type lighting unit, and includes the projection lens 111 which is disposed on the optical axis Ax extending in the front and rear direction of the vehicle, the halogen bulb 123 which is disposed rearwardly of the rear-side focal point F of the projection lens 111, the reflector 125 which reflects the direct light emitted from the halogen bulb 123 forward so as to converge the light toward the optical axis Ax with a light source 123*a* of the halogen bulb 123 as the first focal point, a movable shade 130 which is disposed between the projection lens 111 and the halogen bulb 123 and blocks a part of reflected light L1 from the reflector 125 and a part of the direct light from the halogen bulb 123 to form the cutoff line of the light distribution pattern, an actuator 120 which moves the movable shade 130 between the blocking position disposed such that an upper end edge 130*a* is positioned in the vicinity of the rear-side focal point F of the projection lens 111 and the blocking lessening position at which the blocked amount of the reflected light L1 from the reflector 125 becomes smaller than the blocked amount at the blocking position, and the additional reflector 128 which is disposed below the optical axis Ax, and diffuses and reflects the direct light from the halogen bulb 123 forward without allowing the direct light to pass through the projection lens 111.

The projection lens 111 is constituted of a flat convex lens that has a convex surface on the front side thereof and a flat surface on the rear side thereof. As shown in FIG. 9, the projection lens 111 is disposed on the optical axis Ax such that the rear-side focal point F thereof is positioned at the second focal point of the reflecting surface 125*a* of the reflector 125. With this structure, an image on the focal point surface including the rear-side focal point F is projected forward as a reverse image.

It is to be noted that, as the projection lens 111 of the present embodiment, a projection lens having an effective surface of 80 mm in diameter is used instead of a normal lens having the effective surface of about 60 mm in diameter. Accordingly, by making a focal length longer and a light source image smaller, it is possible to improve a light amount and a light ray bundle of the lighting unit 118.

In addition, the surface of the projection lens 111 is formed with a microstructure. Accordingly, the projection lens 111 may suppress the reduction in visibility caused by an excessive degree of contrast between brightness and darkness of a cutoff line CL of the lighting unit 118 having enhanced light gathering power.

The halogen bulb 123 is structured as a line segment light source in which the light source 123*a* extends in a direction of a bulb center axis, and is inserted from the side of the reflector 125 and fixed in a direction which causes the bulb axis to substantially intersect the optical axis Ax at a position downwardly apart from the optical axis Ax.

Figure 14:
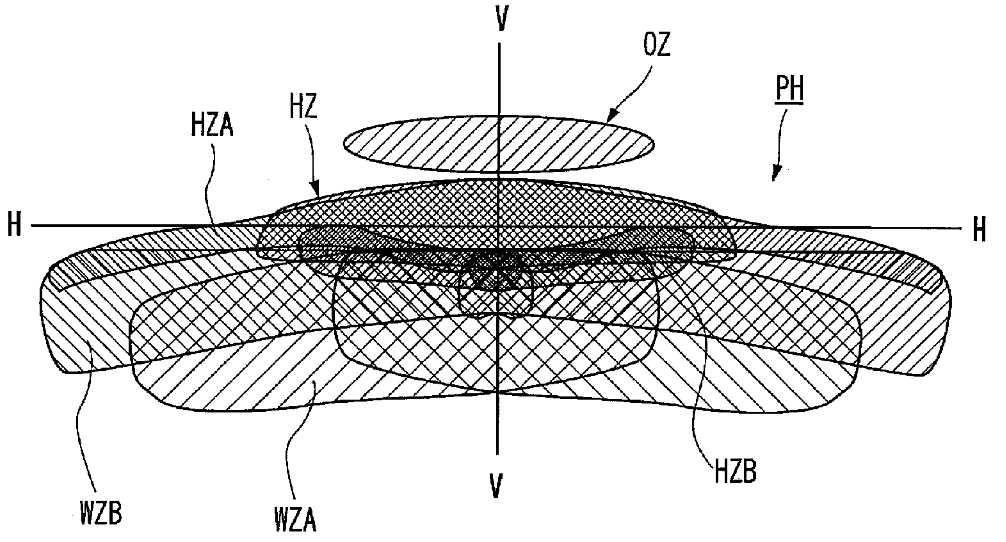
FIG. 14 is a view perspectively illustrating a light distribution pattern of a running beam light distribution pattern formed on a virtual vertical screen placed at a position 25 m ahead of a lighting fixture by light irradiation from a reflector and an additional reflector shown in FIG. 9.

The reflector 125 has reflecting surfaces 125*a*, 125*b*, and 125*c* which form a hot zone (high brightness zone) HZ required for a running beam light distribution pattern PH by reflecting light from the light source 123*a* forward so as to converge the light toward the optical axis Ax (see FIG. 14).

The reflecting surface 125*a* is an elliptical reflecting surface which is formed into a substantially oval shape and has the position of the light source 123*a* as the first focal point and the rear-side focal point F of the projection lens 111 as the second focal point in a vertical cross section thereof including the optical axis Ax, and the eccentricity thereof is set to be gradually increased from the vertical cross section toward the horizontal cross section.

With this structure, the light L1 from the light source 123*a* reflected by the reflecting surface 125*a* is caused to substantially converge in the vicinity of the rear-side focal point F in the vertical cross section, and the position of the convergence is caused to move considerably forward in the horizontal cross section, whereby a diffusion pattern HZA in the hot zone HZ is formed.

The reflecting surface 125*b* shown in FIG. 9 is provided outside the effective reflecting surface in the upper part of the reflector 125, and is adapted to form a converging light pattern HZB in which reflected light L2 is directed to the lower part of the diffusion pattern HZA by the reflected light L1 of the reflecting surface 125*a*.

That is, as shown in FIG. 14, the reflecting surfaces 125*a* and 125*b* of the reflector 125 form the hot zone HZ required for the running beam light distribution pattern PH by combining the diffusion pattern HZA and the converging light pattern HZB by their respective reflected light L1 and L2.

In addition, as shown in FIG. 13, the reflecting surface 125*c* positioned immediately lateral to and above the optical axis Ax is a diffusing surface formed at a part of the reflecting surface of the reflector 125 positioned immediately lateral to the optical axis Ax, and is capable of easily obtaining diffused light L3 in a lateral direction.

As shown in FIG. 10, the additional reflector 128 is disposed below the reflector 125 and includes inside reflecting surfaces 150, outside reflecting surfaces 151, and a reflecting surface for overhead sign 152 which diffuse and reflect a part of the direct light from the halogen bulb 123 forward without allowing the part of the direct light to pass through the projection lens 111.

The inside reflecting surfaces 150 disposed on the left and the right of the optical axis Ax are parabolic reflecting surfaces extending in the front and rear direction of the vehicle along the optical axis Ax, and form a first diffusion pattern WZA spread laterally below the cutoff line.

The outside reflecting surfaces 151 extending in the front and rear direction of the vehicle on both sides of the inside reflecting surfaces 150 are parabolic reflecting surfaces which form a second diffusion pattern WZB spread in a lateral direction below the cutoff line more widely than in the case of the inside reflecting surfaces 150. Further, the outside reflecting surfaces 151 are formed so as to be apart from the optical axis Ax as they go in a forward direction and are formed to make an acute angle with respect to a vertical plane including the optical axis Ax.

Further, the reflecting surface for overhead sign 152 disposed at the front end part of the additional reflector 28 forms a light distribution pattern OZ for OHS irradiation in which the overhead sign (OHS) is directed by upwardly reflecting direct light L6 of the halogen bulb 23.

As shown in FIGS. 11 and 12, the movable shade 130 is press-molded from a metal plate and has a substantially rectangular plate shape, and is provided so as to be positioned in the vicinity below the optical axis Ax. On both end parts of the movable shade 130, shaft support portions 130*b* through which a shaft 142 is rotatably inserted, and abutment portions (surface contact portions) 130*c* for abutting on the bracket 122 to control the rotation at the blocking position are formed by bending.

At the opening edge of the bracket 122 on which the abutment portions 130*c* of the movable shade 130 abut, reinforcement ribs 132*e* formed by forward bending are provided. Accordingly, the stiffness and durability of the movable shade 130 formed from the metal plate member are enhanced by the formation of the abutment portions 130*c* by bending. In addition, since the reinforcement ribs 132*e* formed by bending are also provided at the opening edge of the bracket 122 on which the abutment portions 130*c* of the movable shade 130 abut, the stiffness and durability are also enhanced.

The movable shade 130 is adapted to be capable of taking the blocking position at which the upper end edge 130*a* is positioned in the vicinity of the rear-side focal point F and the blocking lessening position at which the blocked amount of the reflected light from the reflector 125 becomes smaller than the blocked amount at the blocking position. The upper end edge 130*a* of the movable shade 130 is formed to have a lateral level difference between left and right sides thereof, and forms the cutoff line CL of a passing beam light distribution pattern PL when the movable shade 130 is at the blocking position (see FIG. 15).

The part of the upper end edge 130*a* which forms the cutoff line in the vicinity of an oncoming vehicle is formed with a protrusion part protruding as it goes to the end part. The protrusion part prevents the glare to the oncoming vehicle by preliminarily blocking the light distribution pattern in the vicinity of the oncoming vehicle which may be upwardly leaked due to lens aberration of the projection lens 111.

As shown in FIGS. 11 and 13, the movable shade 130 is rotatably supported by the bracket 122 by fixing both end parts of the shaft 142 on the rear surface side using swaging pieces of the bracket 122 by swaging in a state where the shaft 142 of a predetermined length is inserted into insertion holes of shaft support portions 130*b* and 130*b* formed on the left and right end parts.

On the front surface of the bracket 122 which is the opposite surface of the rear surface on which the movable shade 130 is fixed, a stationary shade (shade portion) 133 for preventing the incidence of the stray light on the projection lens 111 while permitting the rotation of the movable shade 130 is provided. That is, a gap for allowing the rotation of the movable shade 130 is formed between the opening portion 122*a* of the bracket 122 and the movable shade 130 which are formed from the plate members. However, it is possible to prevent the leakage of the reflected light of the reflector 125 from the gap by providing the stationary shade 133.

An upper end engagement part of a rod member 140 is coupled to a rod engagement portion 130*d* formed by cutting and raising in the central part of the movable shade 130. A notch hole formed by forming the rod engagement portion 130*d* by cutting and raising is covered with a shading piece 130*e* to prevent leaked light.

In addition, at the central part of the lower end edge of the movable shade 130, a stopper piece 130*f* is provided to be protruded rearward. The stopper piece 130*f* controls the range of the rotation by abutting on the stationary shade 133 at its tip part when the movable shade 130 is rotated to be at the blocking lessening position.

A return spring 144 is wound around the shaft 142. The return spring 144 is a metal helical torsion coil spring, and one end part thereof is engaged with the movable shade 130 and the other end part thereof is engaged with the stationary shade 133 attached to the bracket 122. The return spring 44 is adapted to elastcally bias the movable shade 130 toward the blocking position constantly. When the movable shade 130 moves to the blocking position, the abutment portions 130*c* and 130*c* formed on the both end parts abut on the rear surface of the bracket 122 to position the movable shade 130 at the blocking position.

By the drive of an actuator 120 coupled to an lower end engagement portion of the rod member 140, the movement of the movable shade 130 between the blocking position and the blocking lessening position is performed.

The actuator 120 is a solenoid disposed such that an output axis 121 thereof is obliquely and downwardly protruded in a front direction of the vehicle below the additional reflector 128. The actuator 120 is screwed to the lower part of the reflector 125 positioned below the additional reflector 128.

The actuator 120 is driven when the operation of the beam selector switch which is not shown is performed, and transmits the linear reciprocating motion of the output axis 121 thereof to the rod member 140 via a rotation plate 155 of an operating direction conversion mechanism 153 to cause the movable shade 130 coupled to the upper end engagement portion of the rod member 140 to rotate.

The rod member 140 is constituted of a wire-like member formed by bending the upper and lower engagement portions thereof into an L shape. Accordingly, when the rod member 140 reciprocates along a substantially vertical direction, the movable shade 130 having the rod engagement portion 130*d* coupled to the upper end engagement portion performs rotation between the blocking position and the blocking lessening position about the shaft 142 extending in the width direction of the vehicle.

Next, a description will be given to an optical action of the movable shade 130.

As shown in FIGS. 9 and 13, in a state where the movable shade 130 is at the blocking position, the upper end edge 130*a* thereof for forming the cutoff line CL on the passing beam light distribution pattern PL is disposed so as to pass through the rear-side focal point F of the projection lens 111. With this structure, a part of the reflected light L1 from the reflecting surface 125*a* of the reflector 125 is blocked and most of the upward light projected forward from the projection lens 111 is removed.

The reflected light L4 and L5 of the inside reflecting surfaces 150 and the outside reflecting surfaces 151 in the additional reflector 128 are directed forward irrespective of the position of the movable shade 130.

Figure 15:
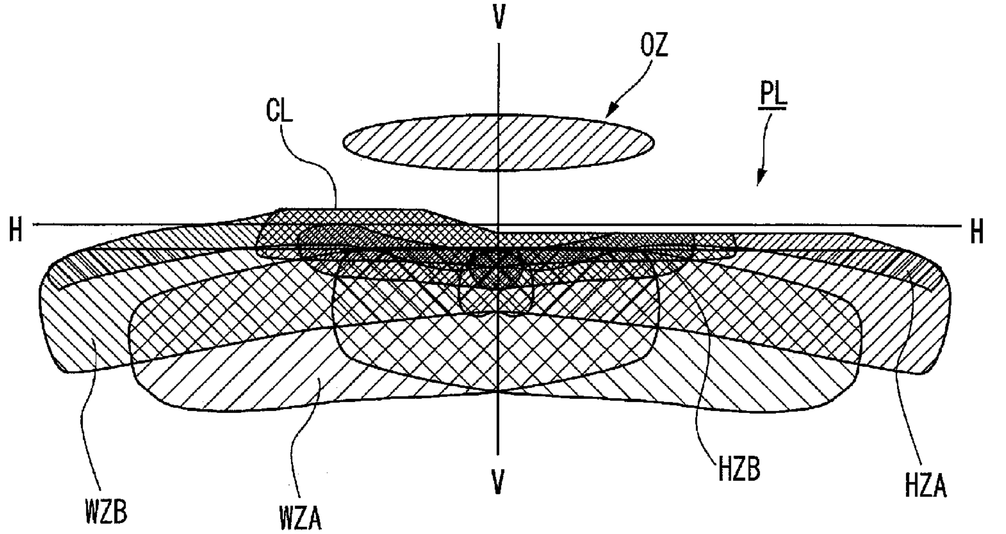
FIG. 15 is a view perspectively illustrating the light distribution pattern of a passing beam light distribution pattern formed on the virtual vertical screen placed at the position 25 m ahead of the lighting fixture by the light irradiation from the reflector and the additional reflector shown in FIG. 9.

Subsequently, by combining the reflected light L1 of the reflecting surface 125*a* in the reflector 125 and the reflected light L4 and L5 of the inside reflecting surfaces 150 and the outside reflecting surfaces 151 in the additional reflector 128, the passing beam light distribution pattern PL for left hand traffic having what is called the Z-shaped cutoff line CL having a lateral level difference between left and right sides thereof shown in FIG. 15 is formed.

On the other hand, when the movable shade 130 moves from the blocking position to the blocking lessening position, the upper end edge 130*a* thereof is obliquely and downwardly displaced in the rearward direction, and the blocked amount of the reflected light L1 from the reflecting surface 125*a* of the reflector 125 is reduced. In the present embodiment, the blocked amount of the reflected light from the reflecting surface 125*a* is reduced to be substantially zero.

Subsequently, by combining the reflected light L1 of the reflecting surface 125*a* in the reflector 125 and the reflected light L4 and L5 of the inside reflecting surfaces 150 and the outside reflecting surfaces 151 in the additional reflector 128, the running beam light distribution pattern PH shown in FIG. 14 is formed.

That is, in accordance with the vehicle headlamp 100 of the present second embodiment thus described, since the stationary shade 133 for covering the gap formed between the movable shade 130 and the opening edge is provided at the opening portion 122*a* of the bracket 122 for rotatably supporting the movable shade 130, it is possible to prevent the leakage of the reflected light of the reflector 125 from the gap formed between the opening portion 122*a* of the bracket 122 and the movable shade 130 which are formed from the plate members.

Accordingly, since the bracket 122 may be formed from the metal plate member, it is possible to achieve lighter weight than in the case of the formation by aluminum die casting. In addition, since the bracket 122 may be manufactured from the metal plate member by press working or the like, it is possible to achieve lower manufacturing cost than in the case of the manufacturing by the aluminum die casting.

Therefore, it is possible to achieve the weight reduction of the bracket 122 for rotatably supporting the movable shade 130 and thereby provide the lightweight inexpensive projector-type vehicle headlamp 100.

The vehicle headlamp of the present invention is not limited to the structure in each of the above-described embodiments, and may naturally adopt various modes based on the gist of the invention. For example, when the halogen bulb is used instead of the discharge bulb, because a control circuit or the like can be omitted, it is possible to provide an inexpensive projector-type vehicle headlamp with a further reduced weight.

For example, in the above-described embodiments, after the stationary shade 33 (133) is formed separately from the bracket 32 (122), the stationary shade is fixed at the offset position which does not interfere with the movement of the movable shade 30 (130). However, the shade portion may be preliminarily formed integrally with the bracket.

DESCRIPTION OF REFERENCE NUMERALS AND SIGNS

10 . . . vehicle headlamp
11 . . . projection lens
12 . . . lamp body
14 . . . transparent cover (cover)
18 . . . lighting unit
20 . . . actuator
23 . . . light source bulb (discharge bulb)
25 . . . reflector
25*a* . . . reflecting surface
25*b* . . . reflecting surface for overhead sign
30 . . . movable shade
30*a* . . . upper end edge
30*b* . . . shaft support portion
30*c* . . . abutment portion (surface contact portion)
31 . . . lens holder
32 . . . bracket
32*a* . . . opening portion
33 . . . stationary shade (shade portion)
40 . . . rod member
Ax . . . optical axis

What is claimed is:

1. A vehicle headlamp comprising:

a projection lens disposed on an optical axis extending in a front and rear direction of a vehicle;

a light source disposed rearwardly of a rear-side focal point of the projection lens;

a reflector configured to reflect direct light from the light source forward to converge reflected light toward the optical axis;

a movable shade disposed between the projection lens and the light source and configured to blocking apart of the reflected light from the reflector and a part of the direct light from the light source to form a cutoff line in a light distribution pattern;

a bracket formed from a metal plate member and disposed between the projection lens and the light source, wherein the movable shade is rotatably supported on the bracket;

an opening portion formed in the bracket and configured to pass a part of the reflected light from the reflector along the optical axis; and a shade portion provided on the opening portion and configured to cover a gap between the movable shade and an opening edge of the opening portion.

2. The vehicle headlamp according to claim 1, wherein the shade portion is formed from a metal plate member separately from the bracket and is fixed at an offset position which does not interfere with a movement of the movable shade.

3. The vehicle headlamp according to claim 1, wherein the movable shade is supported by the bracket through a rotation shaft, and the rotation shaft is fixed on the bracket by swaging.

4. The vehicle headlamp according to claim 1, wherein the movable shade is formed from a metal plate member, a surface contact portion for abutting on a rear surface of the opening edge of the bracket is formed at an each end part of the movable shade in a horizontal direction, and a reinforcement rib is provided at the opening edge of the bracket on which the surface contact portion abuts.

* * * * *